(12) United States Patent
Abhau

(10) Patent No.: US 10,965,911 B2
(45) Date of Patent: Mar. 30, 2021

(54) SURROUND VIEW SYSTEM FOR A VEHICLE

(71) Applicant: MANDO CORPORATION, Gyeonggi-do (KR)

(72) Inventor: Jochen Abhau, Frankfurt am Main (DE)

(73) Assignee: MANDO CORPORATION, Gyeonggi-Do (KR)

( * ) Notice: Subject to any disclaimer, the term of this patent is extended or adjusted under 35 U.S.C. 154(b) by 283 days.

(21) Appl. No.: 15/081,832

(22) Filed: Mar. 25, 2016

(65) Prior Publication Data
US 2016/0286170 A1    Sep. 29, 2016

(30) Foreign Application Priority Data

Mar. 26, 2015    (DE) .......................... 102015205507.8

(51) Int. Cl.
*B60R 1/00*    (2006.01)
*B60R 11/04*   (2006.01)
(Continued)

(52) U.S. Cl.
CPC .............. *H04N 7/181* (2013.01); *B60R 1/00* (2013.01); *B60R 11/04* (2013.01);
(Continued)

(58) Field of Classification Search
CPC .............. B60R 1/00; B60R 2300/105; B60R 2300/303; B60R 2300/607;
(Continued)

(56) References Cited

U.S. PATENT DOCUMENTS

2012/0069153 A1* 3/2012 Mochizuki ................ B60R 1/00
                                                               348/47
2013/0162830 A1* 6/2013 Mitsuta ..................... B60R 1/00
                                                               348/148
(Continued)

FOREIGN PATENT DOCUMENTS

EP      2 511 137           10/2012
EP      2709069 A1 *  3/2014  ........... G06T 15/205
(Continued)

OTHER PUBLICATIONS

EP2709069A1: Method and apparatus for an imaging driver assistance system with adaptive allround view display: (Inventor(s): Beuschel Ralf [DE]; Weuffen Dieter [DE]; Abhau Jochen [AT] + (Beuschel, Ralf, ; Weuffen, Dieter, ;Abhau, Jochen).*

(Continued)

*Primary Examiner* — Dave Czekaj
*Assistant Examiner* — Samuel D Fereja
(74) *Attorney, Agent, or Firm* — Ladas & Parry, LLP

(57) ABSTRACT

A surround view system for a vehicle, comprising a camera positioned in or on the vehicle to capture the vehicle's surroundings, an evaluation unit processing images captured by the camera and a display displaying a top-view image generated by the evaluation unit. The evaluation unit obtains the top-view image by calculating a projection of the captured images onto a virtual projection surface and by calculating a top-view of the projection on the virtual projection surface. The virtual projection surface comprises a flat bottom part and a rising part adjacent to the flat bottom part, wherein, in an area comprising the rising part at one side of the vehicle over a length of the vehicle, a curvature of the virtual projection surface is zero in a longitudinal direction of the vehicle.

15 Claims, 4 Drawing Sheets

Figure 1:
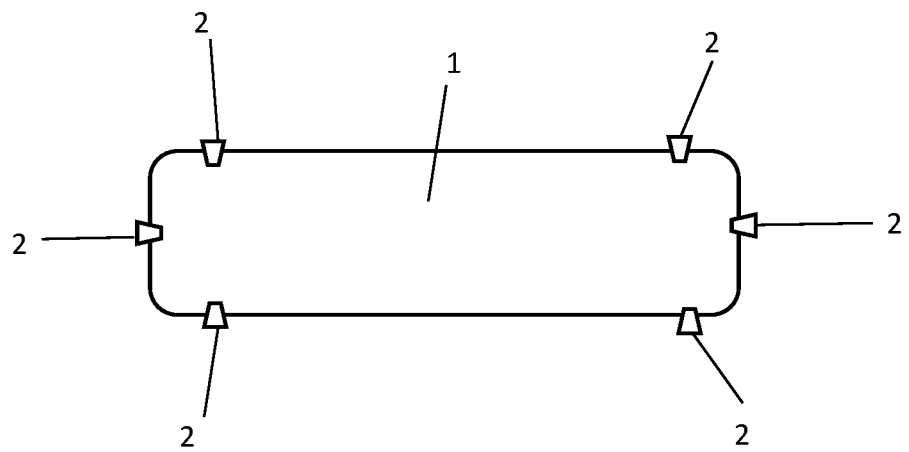

(51) Int. Cl.
*H04N 7/18* (2006.01)
*G06T 3/40* (2006.01)
*G06K 9/00* (2006.01)
*H04N 5/232* (2006.01)
*G08G 1/16* (2006.01)

(52) U.S. Cl.
CPC ........ *G06K 9/00791* (2013.01); *G06T 3/4038* (2013.01); *H04N 5/23229* (2013.01); *B60R 2300/102* (2013.01); *B60R 2300/105* (2013.01); *B60R 2300/607* (2013.01); *B60R 2300/8026* (2013.01); *G06T 2207/10016* (2013.01); *G06T 2207/20068* (2013.01); *G06T 2207/20221* (2013.01); *G06T 2207/30252* (2013.01); *G08G 1/166* (2013.01); *G08G 1/167* (2013.01); *G08G 1/168* (2013.01)

(58) Field of Classification Search
CPC . B60R 2300/30; B60R 11/04; B60R 2300/20; B60R 2300/10; B60R 2300/308; B60R 2300/80; B60R 1/002; B60R 2300/202; B60R 2300/605; B60R 2300/802; B60R 2300/8093; B60R 2300/102; B60R 2300/106; B60R 2300/60; B60R 2300/8026; B60R 2300/301; B60R 2300/305; B60R 2300/50; B60R 2300/602; B60R 2300/804; B60R 2300/8053; G06T 3/4038; G06T 2207/30252; G06T 3/0018; G06T 15/20; G06T 15/205

See application file for complete search history.

(56) References Cited

U.S. PATENT DOCUMENTS

2014/0055487 A1* 2/2014 Kiyo .................. B60R 1/002
                                                              345/629
2014/0347485 A1* 11/2014 Zhang ................ B60R 11/04
                                                              348/148

FOREIGN PATENT DOCUMENTS

| JP | 2014-41398 | 3/2014 |
|----|------------|--------|
| JP | 2014-154904 | 8/2014 |
| WO | 2013/018173 | 2/2013 |

OTHER PUBLICATIONS

EP2709069 (A1) Machine translocation (Year: 2014).*
Office Action dated May 2, 2017 for Korean Patent Application No. 10-2016-0036620 and its English machine translation by Global Dossier.

* cited by examiner

SURROUND VIEW SYSTEM FOR A VEHICLE

CROSS-REFERENCE TO RELATED APPLICATION

This application claims the priority to German Patent Application No. 102015205507.8, filed on Mar. 26, 2015, the disclosure of which is incorporated herein by reference in its entirety.

The invention relates to a surround view system for a vehicle, comprising at least one camera, an evaluation unit and at least one display, and to a vehicle comprising such a surround view system.

Driver assistance systems are often equipped with cameras to capture the surroundings of the vehicle. In order to display the captured images as a surround view of the vehicle in one display, the images may need to be composed appropriately in order to aid the driver of the vehicle.

In EP 2511137 A1, a surround view system for a vehicle is disclosed, where several cameras are located on the different sides of the vehicle and the surround view is then generated by projecting the camera-captured images onto a bowl-shaped projection surface, which is then viewed from above by a virtual observer. The bowl shape of the projection surface causes cars which are travelling in a lane next to the vehicle to seemingly be moving on an arc around the vehicle, thus making the displayed surround-view image difficult to interpret correctly by the driver of the vehicle.

The object of the present invention is therefore to provide a surround view system which generates a birds-eye view of the vehicle's surroundings that is easy to interpret correctly by a driver of the vehicle at a low computational cost, the system being not more complex than the surround view system according to above mentioned prior art.

This objective is achieved by the inventive surround view system according to claim 1, Advantageous embodiments of the inventive system are disclosed in the dependent claims.

The inventive surround view system comprises at least one camera, which is to be positioned in or on the vehicle to capture at least a part of the vehicle's surroundings.

Furthermore, the surround view system comprises an evaluation unit for processing images captured by the at least one camera and at least one display for displaying a top-view image which has been generated by the evaluation unit.

According to the invention, the evaluation unit is configured for obtaining the top-view image by calculating a projection of the captured images onto a virtual projection surface and by then calculating a top-view of the projection on the virtual projection surface.

Hereby, the virtual projection surface comprises a flat bottom part and a rising part adjacent to the flat bottom part. The virtual projection surface is designed such that, in an area comprising the rising part at least at one side of the vehicle at least over a length of the vehicle, a curvature of the virtual projection surface is zero in a longitudinal direction of the vehicle. As the projection surface does not curve in the direction of the vehicle's length, cars as well as other objects, which are positioned or moving parallel to the vehicle's length appear parallel to the vehicle, straight and undistorted. Thus, the display shows a realistic image of the relevant portions of the vehicle's immediate surroundings, which is easy to interpret correctly by the driver of the vehicle.

The steps of calculating the projection of the captured images onto the virtual projection surface and of calculating the top-view of the projection surface may, of course, mathematically be combined into one single projecting or mapping step.

In typical embodiments, at least one of the cameras may be positioned on each side of the vehicle, so as to capture a full surround view of the vehicle. Hereby the cameras may, for example, be fish-eye cameras. This way, the surroundings of the vehicle along at least the left and right length of the vehicle may be captured. In this case, it may be particularly useful if the area where the curvature of the virtual projection surface in longitudinal direction of the vehicle is zero comprises the rising part of the projection surface at both sides of the vehicle, at least over a length of the vehicle. This may ensure that cars travelling parallel to the vehicle on both sides of the vehicle are displayed to be moving on straight lines.

It may be preferable that in an area comprising the rising part of the projection surface in front of and/or behind the vehicle at least over a width of the vehicle, the curvature of the virtual projection surface is zero in lateral direction of the vehicle. This can ensure that objects and lines which are positioned at a right angle with respect to the length of the vehicle, such as a car moving across an intersection in front of the vehicle, also appear straight and undistorted in the surround view.

Alternatively, the rising part of the projection surface may be open on at least one end of the vehicle, such that the bottom part as well as the rising part stretch to infinity in front and/or rear of the vehicle. Then the area where the curvature of the virtual projection surface in the longitudinal direction of the vehicle is zero comprises the whole rising part in front and/or rear of the vehicle, which causes the projection surface to have a groove shape. This shape of the projection surface is especially suited for displaying objects that are parallel to the length of the vehicle realistically. Especially those cars or other objects that are positioned or moving parallel to the length of the vehicle in front of or behind the vehicle, for example in another lane ahead of the vehicle, are displayed in a way that is easy to interpret correctly by the driver of the vehicle.

Further, it is possible for the rising part of the projection surface to surround the bottom part of the projection surface, thus forming a substantially tub-shaped projection surface. Hereby the rising part is uncurved in longitudinal direction along the left and right length of the vehicle and may be curved or uncurved in lateral direction along the front and rear width of the vehicle.

It may hereby be particularly preferable if the uncurved rising part in longitudinal direction along both sides of the vehicle is combined with flat, slanted, nearly vertical or vertical rising parts along one or both ends of the vehicle. The vertical or nearly vertical rising parts are computationally inexpensive while resulting in objects, such as cars or bicycles, that are moving in crosswise direction with respect to the length of the vehicle in front of and/or behind the vehicle, to be displayed as moving on a straight line in lateral, or crosswise direction of the vehicle, thus making the resulting displayed image easy to interpret correctly by the driver of the vehicle.

The rising part of the projection surface may, at least at one side or end of the vehicle, be flat, slanted and adjacent to the bottom surface. Alternatively the rising part may be composed of several flat slanted and progressively steeper portions, such that a line where two adjacent slanted portions meet is straight and parallel to the longitudinal or lateral direction of the vehicle. The number and heights of the slanted portions may vary. There may be one, two, three or more slanted portions. More, thinner slices cause the projection image to be smoother, while fewer and thicker slices make the projection surface and all necessary computation associated with the projection less complex.

Alternatively, the projection surface may be defined such that the rising part of the projection surface forms a regular surface, that is a surface that can be differentiated at any given point of the surface. A regular projection surface leads to a particularly smooth projection image but causes higher computational complexity of the projections.

The evaluation unit may be configured to calculate the top-view of the projection on the virtual projection surface by projecting the projection on the virtual projection surface onto a plane parallel to the bottom part of the virtual projection surface. This way the top-view is an undistorted birds-eye view of the projection surface.

Alternatively, the evaluation unit may be configured to calculate the top-view of the virtual projection surface according to a view of a virtual observer who is located above the projection surface. When the virtual observer is placed further and further away from the projection surface, the top-view according to a virtual observer can approximate the birds-eye view generated by the projection onto a plane, as described above.

If multiple cameras are used for capturing the surroundings of the vehicle as a basis for calculating the surround view of the vehicle, the images captured by the different cameras and/or their projections may need to be composed in order to form the surround view or top-view of the vehicle and its surroundings.

Therefore, the evaluation unit may further be configured for generating the top-view image as a composed top-view, according to one of three preferable options described in the following. The main objective when calculating a composed image is to smooth-out the overlaps and/or gaps which result from the positioning and wide-angle widths of the several cameras.

As a first option for generating the top-view image as a composed top-view, the evaluation unit may be configured to compose the images captured by the cameras to form a composed image, to project the composed image onto the virtual projection surface and to generate a top-view of the projection of the composed image on the virtual projection surface.

As a second option, the evaluation unit may be configured for composing projections of the images captured by the different cameras to form the projection of the captured images on the virtual projection surface as a composed projection image and by calculating the top-view of the composed projection image.

As a third option, the evaluation unit may be configured for composing top-views of the projections of the images captured by the different cameras on the virtual projection surface.

The above three option for generating a composed top-view differ only as to when the several images are composed during the calculation of the top-view, identical or nearly identical top-views may be generated based on each of the above options for generating a composed top-view based on several camera images.

Preferably the surround view system is used in a vehicle, with the display located within an interior space of the vehicle in a position visible to the driver of the vehicle.

Exemplary embodiments of the invention are described below referring to the following figures, which show FIG. 1 a schematic top-view of a vehicle equipped with a surround-view system including several cameras, FIG. 2 a block diagram of the surround view system, FIG. 3 a perspective view of a surface corresponding to a virtual projection surface used by the surround view system, FIG. 4 a schematic illustration of a projection of a camera image and a view from above by a virtual observer, FIG. 5 a top-view of a front right corner of a projection mesh of a different virtual projection surface, FIG. 6 a vertical cross section of a regular projection surface, and FIG. 7 a top-view showing two horizontal cross sections of the regular projection surface of FIG. 6.

FIG. 1 shows a vehicle 1 which is equipped with a surround view system. The surround-view system comprises six wide-angle cameras 2, two of the cameras 2 being located on each side of the vehicle and one camera 2 being located on each the front and rear of the vehicle 1. Each camera 2 captures a part of surroundings of the vehicle 1. Alternatively, if only some but not all sides of the surroundings of the vehicle 1 are to be captured, cameras 2 only need to be placed on the respective sides of the vehicle 1.

Figure 2:
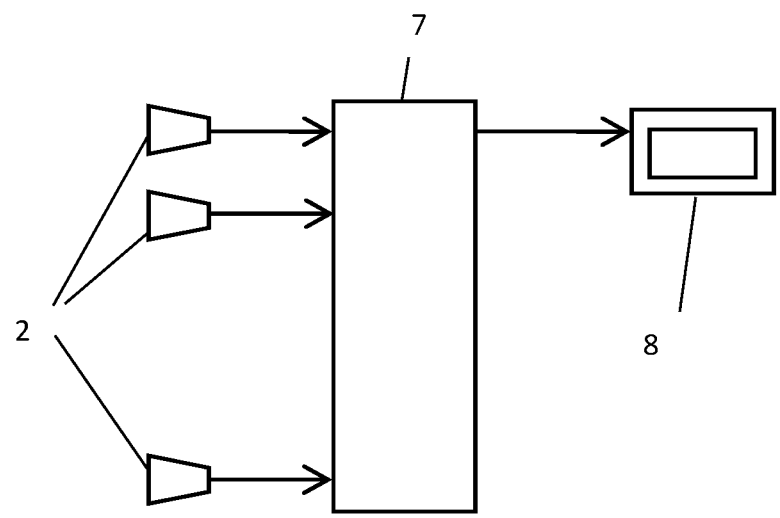

FIG. 2 shows a block diagram illustrating the surround view system in a schematic way. In addition to the cameras 2, the surround view system comprises an evaluation unit 7 and a display 8.

The images captured by the different cameras 2 are transferred to the evaluation unit 7 for processing. The evaluation unit 7 is configured for calculating a projection of the images captured by the cameras 2 onto a virtual projection surface, wherein the projection surface may be shaped as shown in FIG. 3 and described in greater detail below. The evaluation unit 7 then calculates a top-view of the surroundings of the vehicle 1. This top-view is generated as a top-view of the projection on the virtual projection surface. The calculated top-view image is then displayed by the display 8, which is located inside the vehicle 1 in such a way that it is visible to a driver of the vehicle 1. The vehicle 1 may, for example, be an omnibus. The top-view displayed on the display 8 may help the driver to check whether all waiting passengers have boarded already or whether he should wait before opening the doors in order to prevent disembarking passengers from being endangered by a car passing the vehicle 1 at one of it's sides.

Figure 3:
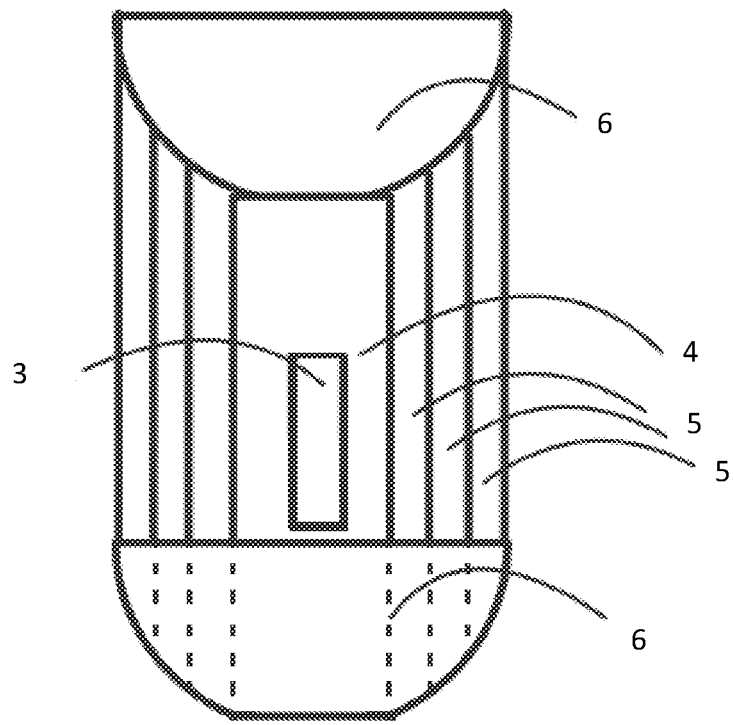

FIG. 3 illustrates the tub-shaped virtual projection surface which is used by the evaluation unit 7 for generating the top-view of the surroundings of the vehicle 1. The virtual projection surface consists of a flat bottom part 4 and a rising part surrounding the bottom part 4. The rising part is composed of several adjacent, flat slanted and progressively steeper segments 5 of elongate rectangular shape along two long sides of the rectangular bottom part 4 and vertical or nearly vertical walls 6 on both short sides of the bottom part 4. The segments 5 are oriented parallel to a longitudinal axis of the vehicle 1.

The virtual projection surface is designed such that a position 3 of the vehicle 1 is in the centre of the flat bottom part 4 and that the flat slanted segments 5 extend for more than the length of the vehicle 1. For example, the uncurved segments 5 along the longitudinal direction of the vehicle 1 can extend for several meters beyond the front or rear end of the vehicle 1.

Figure 4:
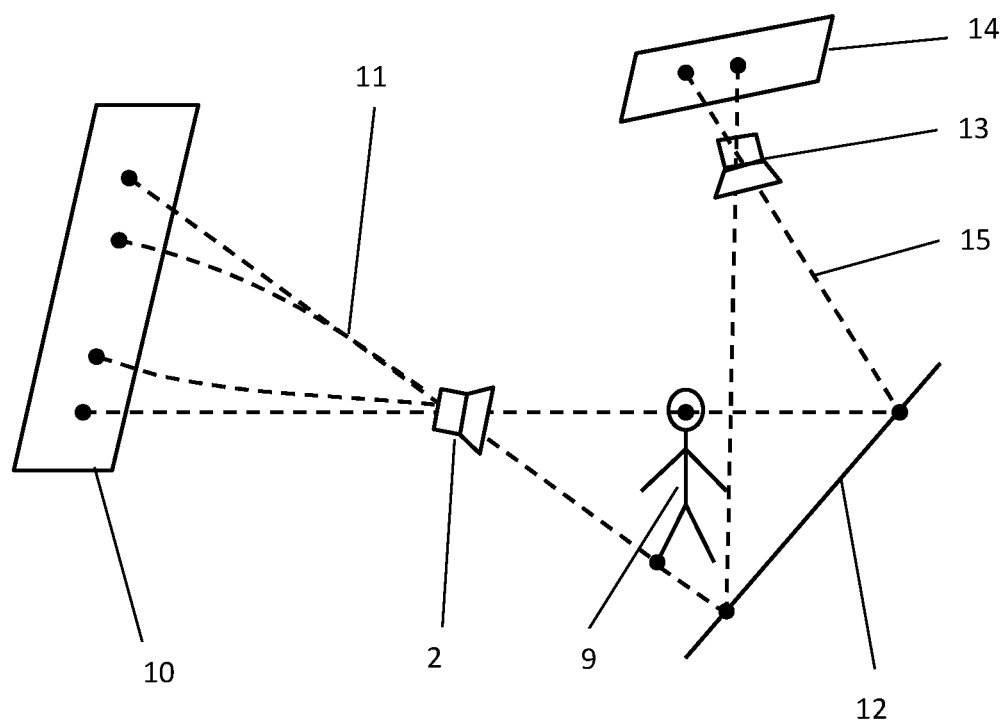

The evaluation unit 7 calculates the top-view of the projection on the virtual projection surface as a view of a virtual observer which located above the projection surface, so that the top-view corresponds to an image 14 taken by a virtual camera 13 which is looking from above onto the virtual projection surface, see FIG. 4.

If the virtual projection surface has no vertical parts, for example if the walls 6 are only nearly vertical or replaced with differently shaped parts, the evaluation unit 7 may generate the top-view by projecting the projection of the images captured by the cameras 2 on the virtual projection surface, onto a virtual plane, which is parallel to the flat bottom part 4 and located above the virtual projection surface.

This way a more or less undistorted birds-eye-view is calculated by the evaluation unit 7. As the virtual projection surface in FIG. 3 is uncurved along the sides as well as in front of and behind the vehicle 1, cars which are moving parallel to the vehicle 1 at any side of the vehicle 1 or which are moving at a right angle with respect to the longitudinal axis of the vehicle 1 behind or in front of the vehicle 1 appear to move along undistorted straight lines on the projection surface. This makes the resulting calculated top-view image, as displayed on the display 8, easy to interpret correctly by the driver of the vehicle 1. This is true in particular as most streets intersect at right angles and most cars, pedestrians or other objects are, therefore, moving either parallel to the road or at a right angle to the road on which the camera-equipped vehicle 1 is positioned.

Furthermore, the projection according to the projection surface of FIG. 3 and, thus, the top-view can be calculated at a low computation cost, due the uncurved design of the different parts of the virtual projection surface.

FIG. 4 shows a schematic view of the surround view system, where one of the cameras 2 is shown as it captures an elevated object 9, in this case a person, resulting in a camera image 10. As a wide-angle lens, such as a fish-eye lens, is used for capturing the image, the camera captured image 10 may appear slightly distorted, as indicated by different projection rays 11.

This image 10 is then projected onto a part 12 of the rising segments 5 of the virtual projection surface. The projection on the virtual projection surface is viewed from above by the virtual camera 13 so as to generate a computed top-view image 14, as indicated by top-view rays 15.

If several cameras 2 are used, which are, for example, positioned on different sides of the vehicle as shown in FIG. 1, several camera images 10 are recorded at the same time, resulting in several computed images 14 according to the virtual observer represented by the virtual camera 13. Therefore, the evaluation unit 7 is furthermore configured for composing the several computed images 14 into a single, smoothly composed top-view image, which is then displayed on the display 8.

Alternatively, it is possible for the evaluation unit 7 to be configured to compose the several images 10 captured by the several cameras 2 into a single composed image and to then compute the projection onto the virtual projection surface and the top-view on the basis of the single composed image.

Another alternative is for the evaluation unit 7 to be configured for composing the several projection images on the virtual projection surface, which result from the images captured by the several cameras 2, into a single projection image and to then compute the top-view based on this single projection image.

According to another exemplary embodiment, the virtual projection surface may also have a shape different from the shape shown in FIG. 3. For example, the vertical walls 6 in front of and/or behind the position 3 of the vehicle 1 may be removed so as to form a bottom part 4 that stretches to infinity in front of and/or behind the vehicle 1. This causes the projection surface to be substantially groove shaped, such that the uncurved rising part of the virtual projection surface to the left and right of the vehicle 1 stretches to infinity, too.

Alternatively, in order to smooth out the corners of the virtual projection surface depicted in FIG. 3, it is possible to replace the vertical walls 6 of the projection surface in front of and/or behind the vehicle 1 by several adjacent slanted segments, similar to the flat slanted and progressively steeper segments 5 along the length of the vehicle in FIG. 3, resulting in a mesh-like virtual projection surface.

Figure 5:
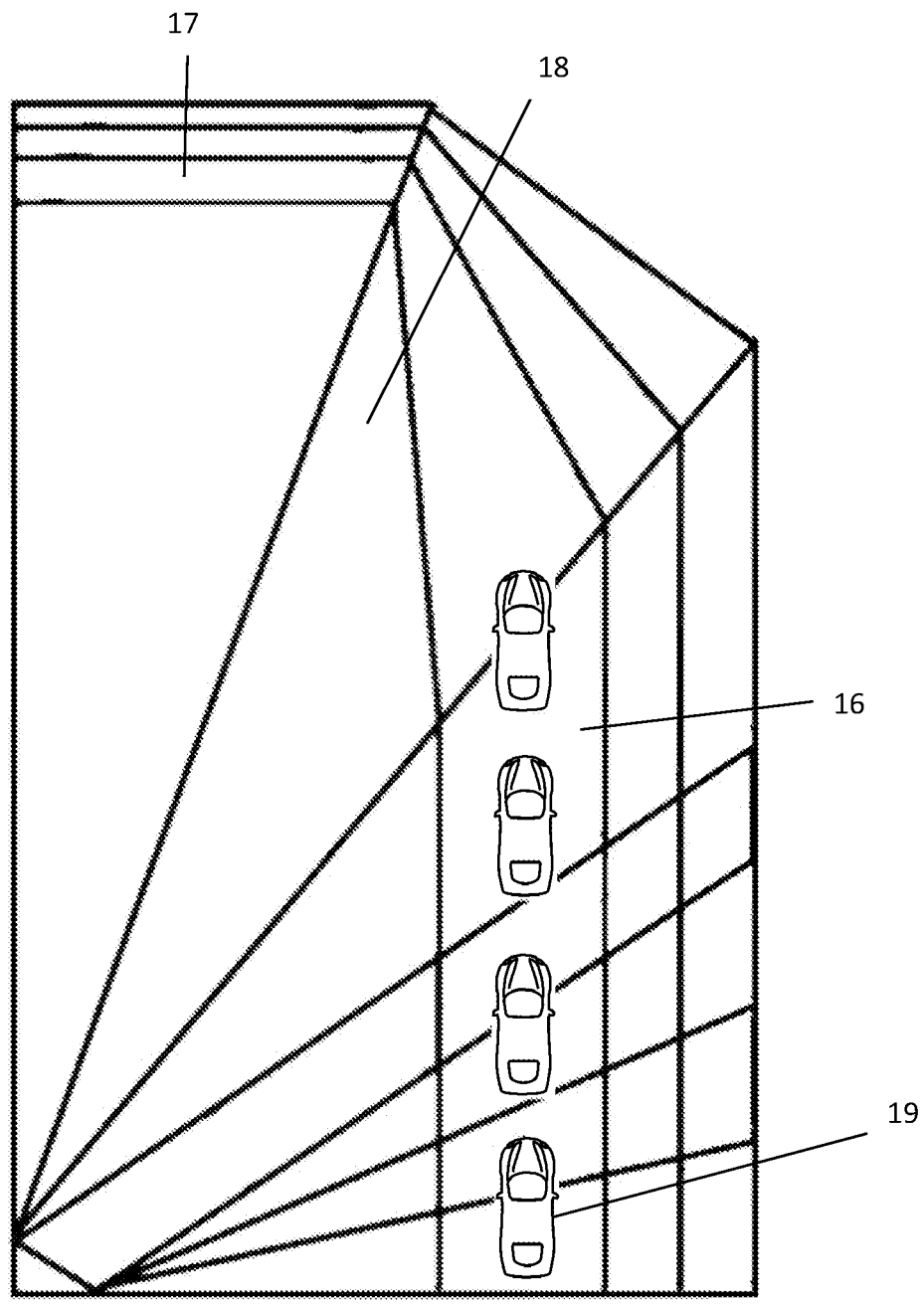

FIG. 5 shows the front right corner of an exemplary embodiment of a virtual projection surface mesh 18 of this kind. Here, in addition to using a rising part composed of several flat and slanted, adjacent segments 16 and 17 both along the sides of the vehicle 1 as well as behind and in front of the vehicle 1, corner pieces of the mesh 18 connect the segments 17 in front of the vehicle 1 and the segments 17 behind or in front of the vehicle 1. These corner pieces are angled so as to smooth out the projection surface in the corner. This way, a car 19 which is travelling parallel to vehicle 1 still appears to be moving along a straight line until the car 19 is far ahead the vehicle 1, while distortions or discontinuities in the corner are reduced to a minimum.

In another embodiment, the virtual projection surface as illustrated in FIG. 3 can be replaced by a regular virtual projection surface, that is a virtual projection surface that can be differentiated at any given point. A vertical cross section 20 of such a projection surface is shown in FIG. 6. The cross section 20 forms a smooth line and the position 3 of the camera-equipped vehicle 1 is in a centre of the flat bottom part 4 of the virtual projection surface.

Taking a horizontal cross section of the same virtual projection surface results in outlines 21,22, where the smaller outline 22 results from a horizontal cross section taken near the bottom part 4 of the virtual projection surface, while the larger outline 21 results from a horizontal cross section taken near the top of the virtual projection surface.

Figure 6:
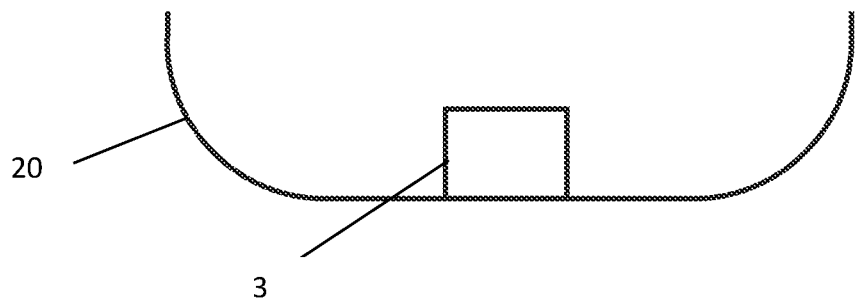
Figure 7:
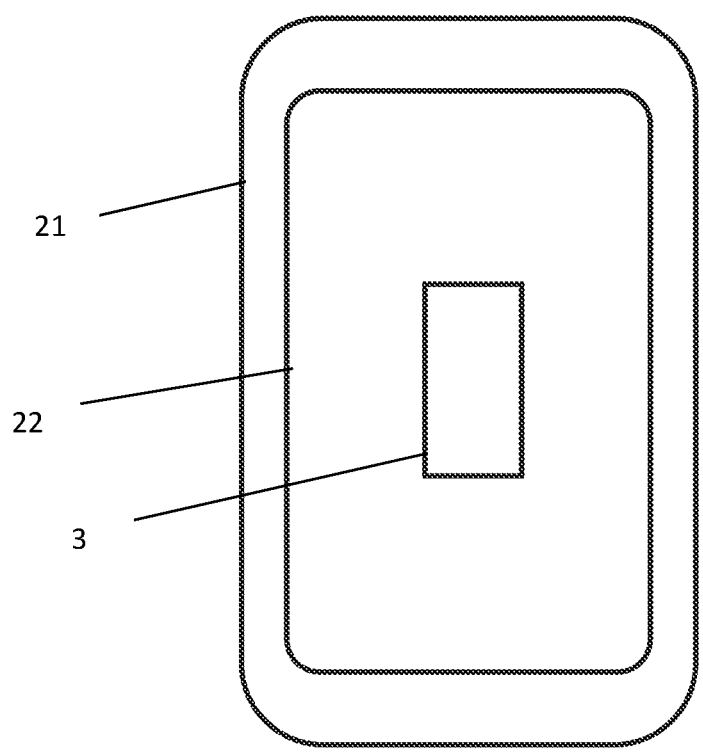

While the virtual projection surface as shown in FIG. 6 and FIG. 7 is regular, the rising part along the length of the vehicle 1 remains uncurved in longitudinal direction of the vehicle as in the other embodiments, and the rising part along the width of the vehicle remains uncurved in lateral direction of the vehicle 1. This regular virtual projection surface results in a particularly smooth projection image and, thus, in a particularly realistic top-view image.

The invention claimed is:

1. A surround view system for a vehicle, comprising
   at least one camera to be positioned in or on the vehicle to capture at least a part of the vehicle's surroundings,
   an evaluation unit configured to process images captured by the at least one camera,
   at least one display configured to display a top-view image generated by the evaluation unit,
   wherein the evaluation unit is configured to obtain the top-view image by calculating a projection of the captured images onto a virtual projection surface and by calculating a top-view of the projection on the virtual projection surface,
   wherein the virtual projection surface comprises a flat bottom part and a rising part adjacent to the flat bottom part,
   wherein the rising part of the projection surface at left and right sides of the vehicle comprises a plurality of flat slanted and gradually steeper multiple surfaces connected to one another in a direction away from the flat bottom part, and
   wherein in an area comprising the rising part in front of and/or behind the vehicle at least over a width of the vehicle, the curvature of the virtual projection surface is zero in a lateral direction of the vehicle.

2. The surround view system according to claim 1, wherein the area where the curvature of the virtual projection surface in the longitudinal direction of the vehicle is zero comprises the rising part of the projection surface at both sides of the vehicle at least over the length of the vehicle.

3. The surround view system according to claim 1, wherein the rising part of the projection surface is open on at least one end of the vehicle with the bottom part and the rising part stretching to infinity in front and/or rear of the vehicle, wherein the area where the curvature of the virtual projection surface in the longitudinal direction of the vehicle is zero comprises the whole rising part in front and/or rear of the vehicle, so that the projection surface has a groove shape.

4. The surround view system according to claim 1, wherein the rising part of the projection surface surrounds the bottom part of the projection surface to form a substantially tub-shaped projection surface.

5. The surround view system according to claim 1, wherein the rising part of the projection surface at least at one side and/or end of the vehicle is flat, slanted and adjacent to the bottom part, wherein a line where two adjacent slanted portions meet is straight and parallel to the longitudinal or lateral direction of the vehicle.

6. The surround view system according to claim 1, wherein the rising part of the projection surface forms a regular surface.

7. The surround view system according to claim 1, wherein the evaluation unit is configured to calculate the top-view of the projection on the virtual projection surface by projecting the projection on the virtual projection surface onto a plane parallel to the bottom part of the virtual projection surface.

8. The surround view system according to claim 1, wherein the evaluation unit is configured to calculate the top-view of the projection on the virtual projection surface according to a view of a virtual observer located above the projection surface.

9. The surround view system according to claim 1, wherein at least one of the cameras is to be positioned on each side of the vehicle.

10. The surround view system according to claim 1, wherein the evaluation unit is further configured to generate the top-view image as a composed top-view by one of composing the images captured by the cameras to form a composed image, projecting the composed image onto the virtual projection surface and generating the top-view of the projection of the composed image on the projection surface; composing projections of the images captured by the different cameras to form the projection of the captured images on the virtual projection surface as a composed projection image and by calculating the top-view of the composed projection image; or composing top-views of the projections of the images captured by the different cameras on the virtual projection surface.

11. A vehicle comprising a surround view system according to claim 1, wherein the display is located within an interior space of the vehicle in a position visible to a driver of the vehicle.

12. The surround view system according to claim 1, wherein a curvature of the plurality of flat slanted and gradually steeper multiple surfaces in the rising part of the projection surface at the left and right sides of the vehicle is zero in a longitudinal direction of the vehicle.

13. The surround view system according to claim 1, wherein lines formed between adjacent two of the plurality of flat slanted and gradually steeper multiple surfaces in the rising part of the projection surface at the left and right sides of the vehicle are straight.

14. The surround view system according to claim 13, wherein the lines formed between adjacent two of the plurality of flat slanted and gradually steeper multiple surfaces in the rising part of the projection surface at the left and right sides of the vehicle are parallel to each other.

15. The surround view system according to claim 1, wherein slanted angles of the plurality of flat slanted and gradually steeper multiple surfaces are gradually increased away from the flat bottom part.

* * * * *